US009372750B2

(12) United States Patent
Chun et al.

(10) Patent No.: US 9,372,750 B2
(45) Date of Patent: Jun. 21, 2016

(54) METHOD AND APPARATUS FOR NON-VOLATILE RAM ERROR RE-MAPPING (71) Applicant: QUALCOMM Incorporated, San Diego, CA (US)

(72) Inventors: Dexter Tamio Chun, San Diego, CA (US); Jung Pill Kim, San Diego, CA (US); Seung Hyuk Kang, San Diego, CA (US); Taehyun Kim, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 58 days.

(21) Appl. No.: 14/070,480

(22) Filed: Nov. 1, 2013

(65) Prior Publication Data
US 2015/0127972 A1    May 7, 2015

(51) Int. Cl.
G06F 11/10 (2006.01)
G06F 12/02 (2006.01)
G06F 11/07 (2006.01)

(52) U.S. Cl.
CPC .......... *G06F 11/1008* (2013.01); *G06F 11/076* (2013.01); *G06F 11/1048* (2013.01); *G06F 11/1068* (2013.01); *G06F 12/0246* (2013.01); *G06F 11/0766* (2013.01); *G06F 2212/7201* (2013.01); *G06F 2212/7204* (2013.01); *G06F 2212/7209* (2013.01)

(58) Field of Classification Search
CPC ... G06F 11/076; G06F 12/00; G06F 11/1008; G06F 11/1048; G06F 11/1068; G11C 11/5628; G11C 11/5642; G11C 29/42; G11C 29/52; G11C 16/0483; G11C 16/26; G11C 2029/0411; G11C 29/50004
USPC .......... 714/763, 764, 721, 723, 718
See application file for complete search history.

(56) References Cited

U.S. PATENT DOCUMENTS

| 6,119,245 | A | 9/2000 | Hiratsuka |
| 7,058,782 | B2 * | 6/2006 | Henderson et al. ........... 711/170 |
| 7,954,021 | B2 * | 5/2011 | Lucas et al. .................. 714/723 |
| 8,060,797 | B2 * | 11/2011 | Hida et al. .................... 714/704 |
| 8,201,024 | B2 * | 6/2012 | Burger et al. .................. 714/42 |
| 8,239,714 | B2 * | 8/2012 | Flynn et al. .................. 714/723 |
| 8,316,278 | B2 * | 11/2012 | Ahn et al. ..................... 714/763 |
| 8,458,514 | B2 | 6/2013 | Harris et al. |
| 8,473,809 | B2 | 6/2013 | Wan et al. |
| 8,589,766 | B2 * | 11/2013 | Post et al. .................... 714/766 |
| 8,732,552 | B2 * | 5/2014 | Chu ............................. 714/766 |
| 2008/0301529 | A1 | 12/2008 | Spanel et al. |
| 2009/0259896 | A1 * | 10/2009 | Hsu et al. ..................... 714/723 |
| 2011/0209028 | A1 | 8/2011 | Post et al. |
| 2012/0072786 | A1 | 3/2012 | Bahali et al. |
| 2012/0102379 | A1 * | 4/2012 | D'Abreu et al. ............. 714/763 |
| 2012/0324299 | A1 | 12/2012 | Moshayedi |
| 2013/0275836 | A1 | 10/2013 | Inada et al. |

OTHER PUBLICATIONS

International Search Report and Written Opinion—PCT/US2014/063532—ISA/EPO—Jan. 30, 2015.

* cited by examiner

*Primary Examiner* — James C Kerveros
(74) *Attorney, Agent, or Firm* — Muncy, Geissler, Olds & Lowe, P.C.

(57) ABSTRACT

A memory module comprising a non-volatile cell array and a re-mapper. A page map table is stored in the non-volatile cell array, and includes mappings of old page addresses to new page addresses. The re-mapper is configured to direct memory operations referencing an old page address to the new page address that the old page address is mapped to. The mappings are created when a memory cell is determined to be in a failure state.

20 Claims, 5 Drawing Sheets

METHOD AND APPARATUS FOR NON-VOLATILE RAM ERROR RE-MAPPING

FIELD OF DISCLOSURE

The invention relates to non-volatile memory.

BACKGROUND

Non-volatile (NV) random access memory (RAM) is expected to replace conventional dynamic random access memory (DRAM) in many applications. NV RAM may make use of spin, magnetic, and other forms of phase or structure changing memory cells.

One problem faced by NV RAM is cell failure caused by finite endurance. The physical stress of changing the phase or structure of a memory cell over repeated programming operations may over time reduce the sensed voltage or current levels when performing a read operation, which may result in a read error. The distribution of endurance for an ensemble of memory cells may be represented by a normal distribution, where some of memory cells in the ensemble may fail much earlier than others.

An error correcting code (ECC) circuit may be used in conjunction with NV RAM, but for cost reasons such codes are usually designed to guarantee a corrected error rate based on the assumption that raw (uncorrected) bit errors are random events occurring as memory cells begin to wear out. Accordingly, once a particular memory cell has reached its endurance limit and begins to fail, that cell will burden the error correcting capabilities of an ECC circuit with its consistent failures. This phenomenon is known as an accumulated error, and is no longer modeled as a random event.

One solution is to design the ECC circuit to correct accumulated errors, but this may not be desirable because more parity check bits are required. Another solution would be to simply mark failing cells in an NV RAM so that they are not to be used. Such an approach is used in NAND flash memory. However, this approach will create holes wherever there is a bad cell, and due to the speed at which RAM operates, and also the requirement for RAM memory to be physically contiguous, this approach is suitable only for relatively slow memories that are not random access in nature.

SUMMARY

Embodiments of the invention are directed to systems and methods for non-volatile ram error re-mapping.

In an embodiment, a method comprises detecting an error in a memory cell of a non-volatile memory when a processor performs a read operation to read a page in the non-volatile memory, the page having a page address and including the memory cell; storing in a table in the non-volatile memory an entry having a memory location of the memory cell and an accumulated number of detected errors for the memory cell; and directing memory operations to the non-volatile memory referencing the page address to a new page address in the non-volatile memory provided the accumulated number of detected errors exceeds a predetermined threshold.

In another embodiment, an apparatus comprises a processor and a memory. The memory comprises a non-volatile (NV) cell array; an error correcting code (ECC) circuit coupled to the NV cell array; and a re-mapper to map page addresses. The processor is coupled to the memory, where the processor in response to the ECC circuit detecting an error in a memory cell of the NV cell array when the processor performs a read operation for a page in the non-volatile memory, stores in a table in the NV cell an entry having a memory location of the memory cell and an accumulated number of detected errors for the memory cell, the page including the memory cell and having a page address. The processor configures the re-mapper to direct memory operations to the NV cell array referencing the page address to a new page address in the NV cell array provided the accumulated number of detected errors exceeds a predetermined threshold.

In another embodiment, a non-transitory, computer readable storage medium having instructions stored thereon that when executed by at least one processor cause a system to perform a method comprising: storing in a non-volatile memory a page map table, the page map table having a set of entries, each entry having a first field and a second field; and configuring a re-mapper in the non-volatile memory based on the page map table, the re-mapper to direct memory operations referencing a page address matching the first field in an entry in the page map table to a page address matching the second field in the entry.

In another embodiment, an apparatus comprises a processor; a means for error detection, the means for error detection to detect an error in a memory cell of a non-volatile memory when the processor performs a read operation to read a page in the non-volatile memory, the page having a page address and including the memory cell; a means for storing, the means for storing to store in a table in the non-volatile memory an entry having a memory location of the memory cell and an accumulated number of detected errors for the memory cell; and a means for re-mapping, the means for re-mapping to direct memory operations to the non-volatile memory referencing the page address to a new page address in the non-volatile memory provided the accumulated number of detected errors exceeds a predetermined threshold.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that specific circuits (e.g., application specific integrated circuits (ASICs)), one or more processors executing program instructions, or a combination of both, may perform the various actions described herein. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
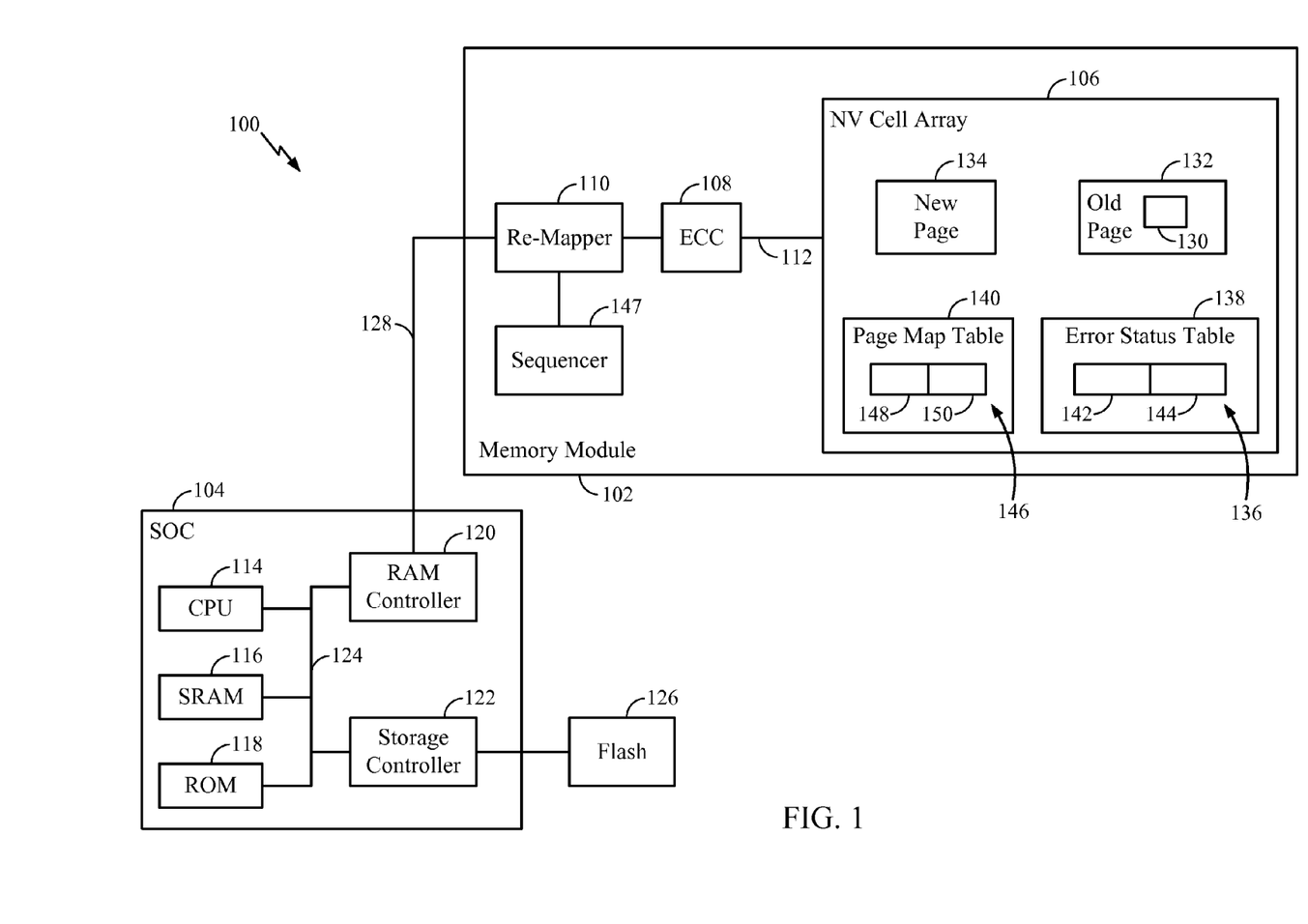
FIG. 1 illustrates a system in which an embodiment finds application.

FIG. 1 illustrates a system 100 in which an embodiment finds application. The system 100 comprises a memory module 102 and a sub-system 104. The sub-system 104 may be a system-on-chip, or it may comprise multiple chips and interconnects. The memory module 102 comprises an NV cell array 106, an ECC circuit 108, and a re-mapper 110. The NV cell array 106 comprises a plurality of memory cells, where the memory cell 130 is a simplified representation. The NV cell array 106, ECC circuit 108, and re-mapper 110 may be realized on one or more chips. The ECC circuit 108 is coupled to the NV cell array 106 by way of the array bus 112.

The sub-system 104 comprises a processor 114 (e.g., a central processing unit or application processor), static random access memory (SRAM) 116, read only memory (ROM) 118, a RAM controller 120, and a memory storage controller 122. These components communicate by way of the system bus 124. The sub-system 104 may comprise many more components, and some or all of these components may be integrated together on one or more chips. The memory storage controller 122 provides communication to other types of storage, such as for example flash memory 126. The RAM controller 120 provides interface signals from and to the memory module 102 by way of the RAM bus 128.

In an embodiment, when a memory cell fails, the error is corrected and the page associated with the failed memory cell is re-written to a new page. The old page is no longer used and further references to it are re-mapped to the new page. For example, the memory cell 130 is shown schematically as contained in the page 132. If the memory cell 130 is detected to be in a failure state, then the page 132 is re-mapped to a new page, for example the page 134. This process is explained further as follows, where in the description of the embodiments it is convenient to refer to the page containing the failed memory cell as the old page, and the page to which it will be mapped as the new page.

When the processor 114 performs a read operation on the NV cell array 106 to retrieve a page and a bit error is detected in a memory cell, the ECC circuit 108 corrects the error so that the processor 114 has available the correct bit value, and the ECC circuit 108 stores in the NV cell array 106 an error status indicating the memory cell location. The error status may also include the accumulated number of times for which an error has been detected for the memory cell. In FIG. 1, the error status is indicated as an entry 136 in an error status table 138, and includes a field 142 for identifying the location (physical address) of the memory cell associated with the error status entry 136, and a field 144 for storing the accumulated number of detected errors for the memory cell.

The processor 114, which may be viewed as an external host processor, reads the error status table to determine if a memory cell is in a failure state, that is, if a memory cell should be declared failed (bad). The processor 114 may check the error status table 138 periodically or according to an algorithm, or the processor 114 may check the error status table 138 whenever a read operation is performed.

A memory cell indicated in the error status entry 136 of the error status table 138 may be declared bad if the number of accumulated detected errors in the field 144 exceeds some predetermined threshold. Once a memory cell has been declared to be in a failure state, its associated error status entry in the error status table 138 may be updated to reflect that it has been declared to be in a failure state, or its error status entry may be deleted or ignored.

When a memory cell is declared bad, the processor 114 may already have its associated page in local system memory (e.g., SRAM 116) due to a previous read operation, or if not, then the processor 114 may perform a read operation to bring the page into the local system memory. In any event, the ECC circuit 108 would have corrected the bit error for the memory cell declared to be bad, and the processor 114 will have in its local memory the correct contents of the retrieved page.

Furthermore, when a memory cell is declared bad, the processor 114 configures (programs) the re-mapper 110 so that future references to the address of the page containing the bad memory cell are transparently directed to the address of a new page. Once the re-mapper 110 is configured (programmed), the processor 114 then performs a write operation with the corrected version of the old page that is in its system memory. The corrected content of the old page is now written to the new page in a manner completely transparent to the processor 114. The old page has been re-mapped out of service, and future memory operations referencing the address of the old page are directed to the address of the new page.

The processor 114 also updates a page map table 140 with the mapping information discussed above. The page map table 140 comprises entries, such as the entry 146, comprising fields for two page addresses: the fields 148 and 150. The field 148 stores the address of the old page and the field 150 stores the address of the new page. The correspondence (association) between these two addresses defines the mapping stored in the entry 146.

For some embodiments, during power-on a sequencer 147 in the memory module 102 performs a table copy by retrieving the contents of the page map table 140 and storing the contents into the re-mapper 110. The sequencer 147 may operate under control of software, firmware, or it may be hardwired. The organization of the page map table 140 fields 148 and 150 may be the same as the re-mapper 110 register files 406 i_page_addr and p_page_addr shown in FIG. 4, which will be discussed in more detail later. This allows a table copy to be performed in which the sequencer 147 is a simple, hardware sequencer. In this way, all pages containing failed memory cells are mapped out of service after power-on. The table copy is performed within a pre-determined time limit, after which the processor 114, and other components within the SOC 104, can utilize the memory module 102.

In another embodiment, the processor 114 executes boot software stored in the ROM 118, the SRAM 116, or both, after the boot software is retrieved from the flash memory 126. The processor 114, when executing the boot software, performs the table copy from the page map table 140 to the re-mapper 110. For such an embodiment, the sequencer 147 is not required.

With the mapping information stored in the page map table 140, where the page map table 140 is stored in the NV cell array 106, the table copy as described above enables portability of the memory module 102 so that it may easily be moved or shared among different devices.

Figure 2:
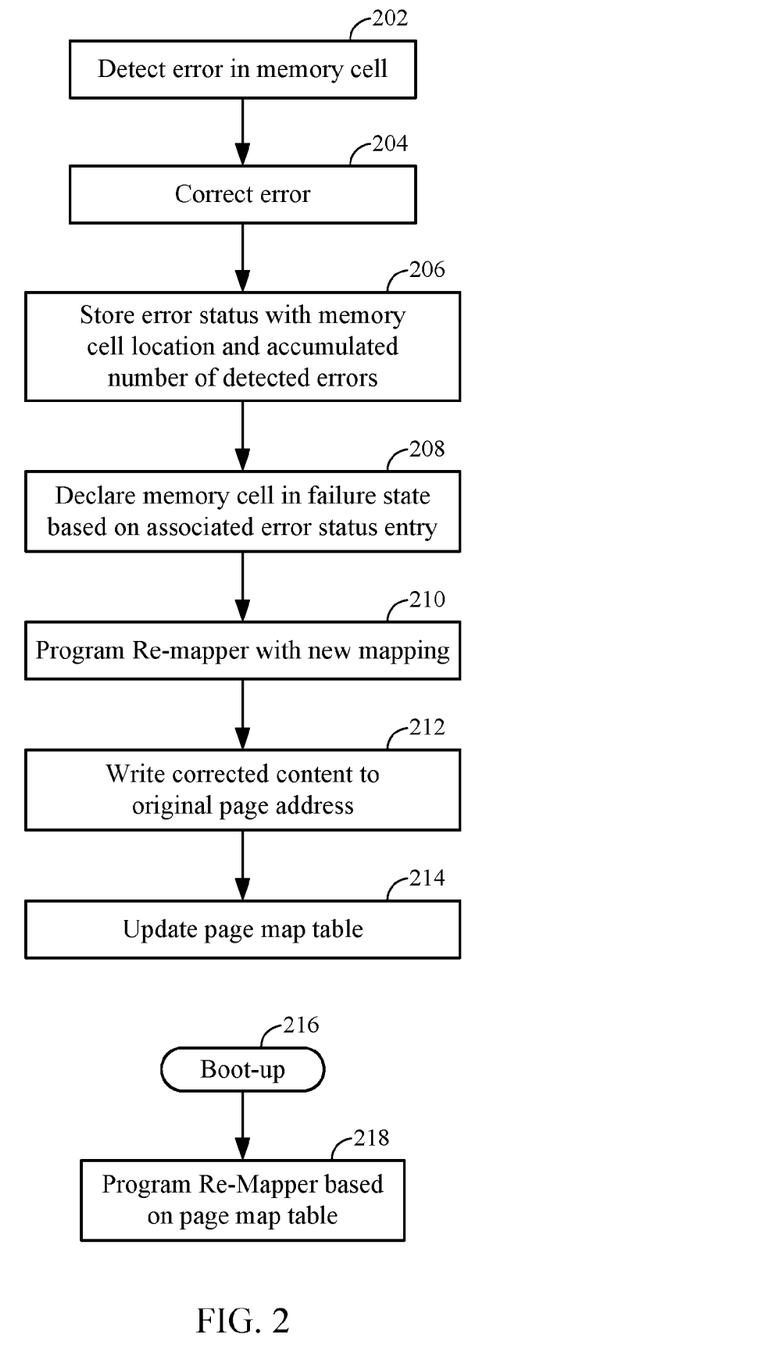
FIG. 2 is a flow diagram illustrating a process according to an embodiment.

FIG. 2 is a flow diagram illustrating the above-described process according to an embodiment. When an error in a memory cell in the NV cell array 106 is detected (202), the ECC circuit 108 corrects the error (204) so that the processor 114 has the correct contents of the associated page. The ECC circuit 108 stores in the error status table 138 an error status entry identifying the location of the memory cell and the accumulated number of detected errors (206). If the error status entry for the memory cell is newly created, then the accumulated number of detected errors is simply one. If the error status entry has previously been created, then the previously stored accumulated number of detected errors is incremented by one.

Based upon information stored in the error status entry, which may be checked periodically or when a read operation is performed, the processor 114 may declare the memory cell to be in a failure state (208). The processor 114 configures the re-mapper 110 with a new mapping to map the page address associated with the failed memory cell to a new page address (210). The processor 114 writes the corrected page contents to its original page address, but because the re-mapper 110 has been configured with the new mapping, the corrected page contents are written to the new page address (212). The processor 114 updates the page map table 140 in the NV cell array 106 with the new mapping (214).

When the system performs a boot-up (216), the processor 114 accesses the page map table 140 stored in the NV cell array 106 of the memory module 102 and configures the re-mapper 110 according to the data stored in the page map table 140 (218).

The above-described embodiments for detecting memory cell failures and configuring the re-mapper 110 with new mappings are discussed within the context of the system 100 being used in the field by consumer. However, the actions described above may also be performed at the point of manufacture or test. For example, a factory tester can flag errors in the same way as described above, and the factory tester can perform the updating of the page map table 140 as described above.

The processor 114 when executing instructions stored in local memory, such as for example the SRAM 116 or the ROM 118, can perform the above-described actions represented by the boxes 208, 210, 212, 214, and 218. Accordingly, the SRAM 116 and the ROM 118 are examples of computer readable media that store instructions such that when executed by the processor 114 perform a process comprising the actions indicated and discussed with reference to the boxes 208, 210, 212, 214, and 218. For some embodiments, the action indicated by the box 206 may be performed by the ECC circuit 108, or by the processor 114 under program control.

Figure 3:
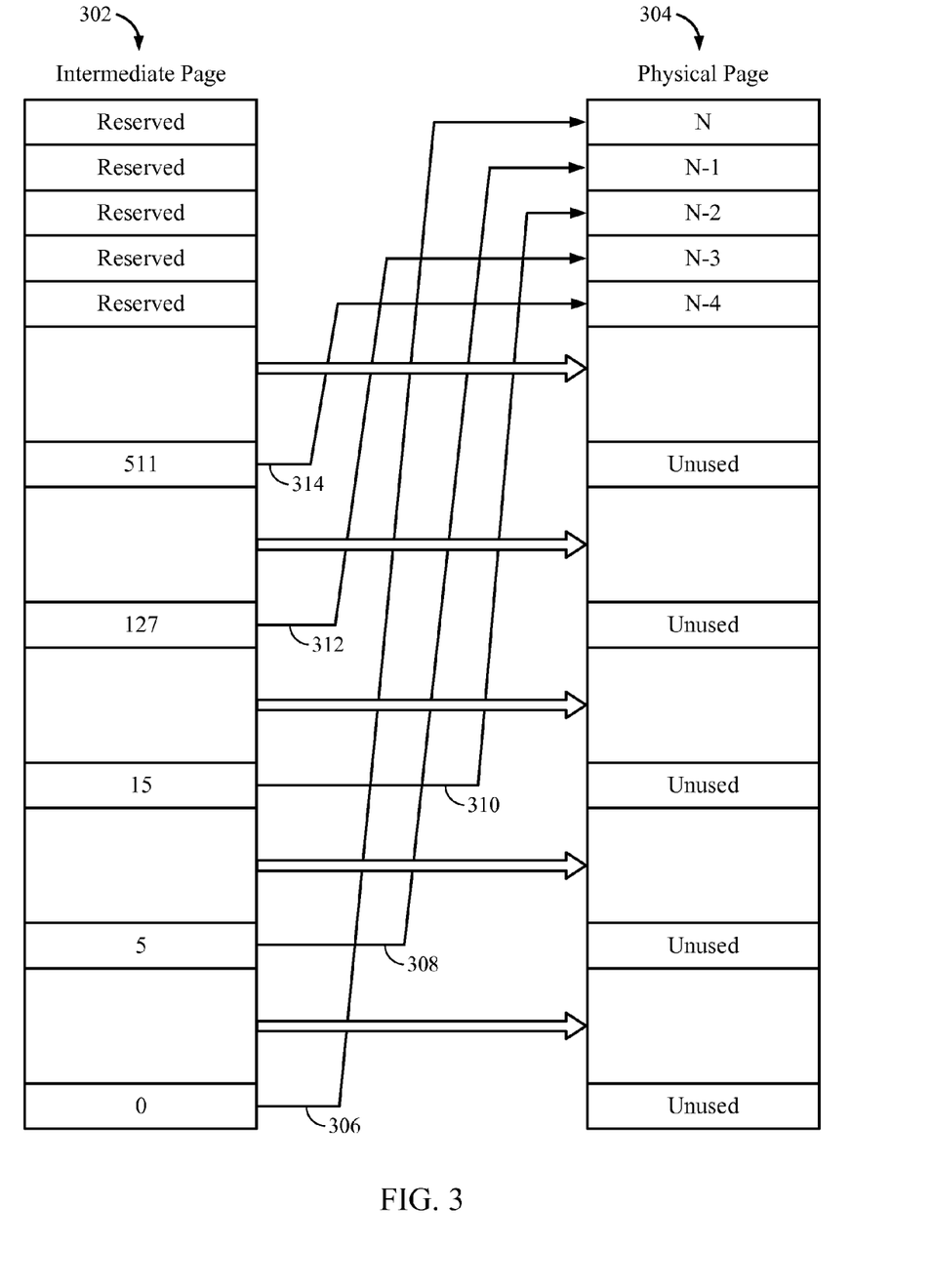
FIG. 3 illustrates a mapping of page addresses according to an embodiment.

FIG. 3 illustrates a mapping of page addresses implemented by the re-mapper 110. The left column, labeled 302 and headed "intermediate page", represents the page address provided as input to the re-mapper 110. The right column, labeled 304 and headed "physical page", represents the page address provided as output of the re-mapper 110. For some embodiments, the page address associated with an address may be the upper 23 bits of the address. The arrows in FIG. 3 indicate the mapping, where the broad arrows represent the identity mapping, mapping blocks to contiguous page addresses. The individually labeled arrows 306, 308, 310, 312, and 314 represent mappings, respectively, of the page addresses 0, 5, 15, 127, and 511 to the higher addresses in the physical page column 304. Accordingly, in the embodiment represented by FIG. 3, the higher addresses in the intermediate page column 302 are reserved.

Figure 4:
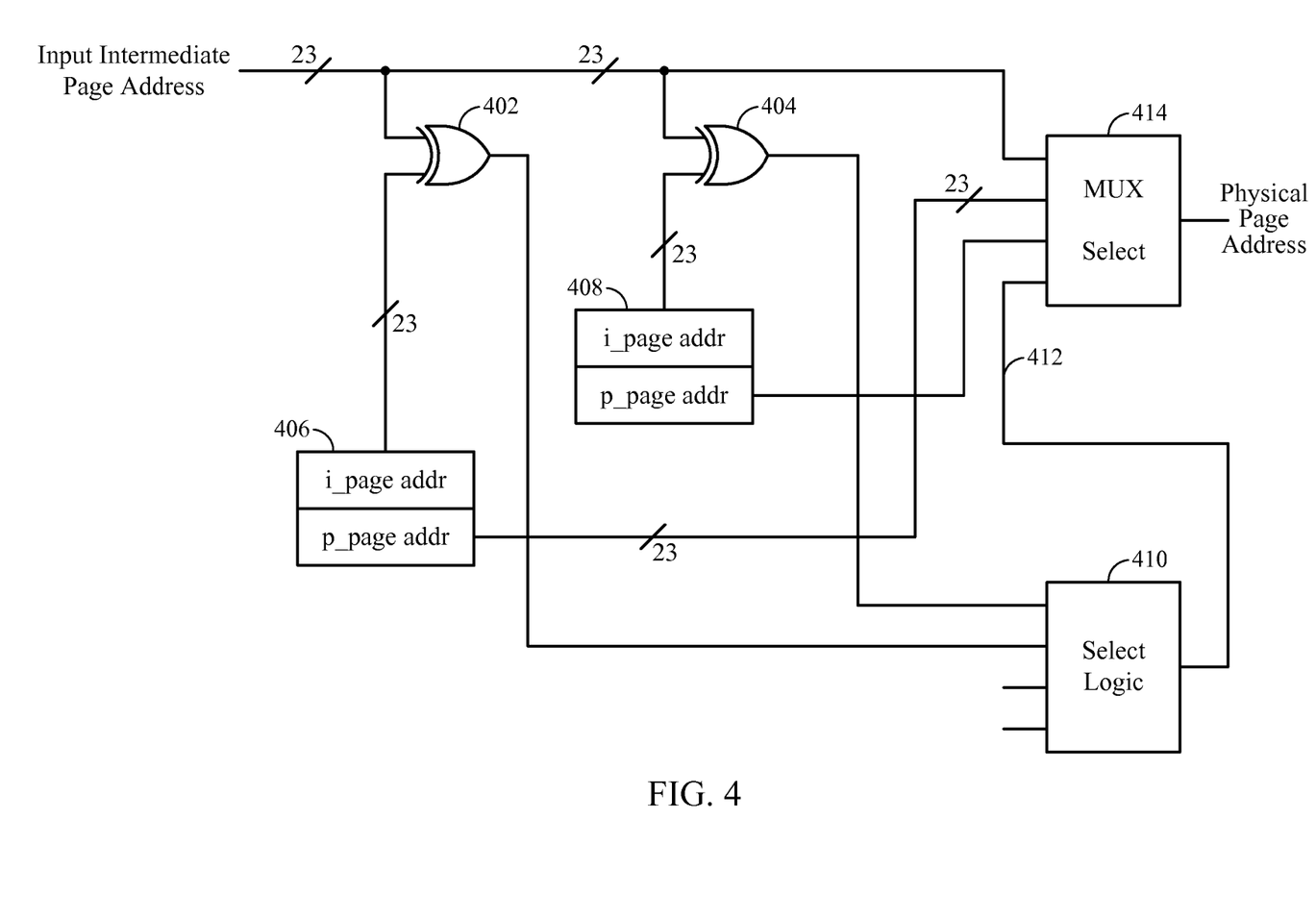
FIG. 4 illustrates a re-mapper according to an embodiment.

FIG. 4 illustrates a more detailed view of the re-mapper 110. For brevity in notation, the terms "i_page addr" and "p_page addr" appearing in FIG. 4 represent, respectively, the intermediate page address and the physical page address. In the particular embodiment of FIG. 4, a page address is represented with 23 bits. An intermediate page address provided as input to the re-mapper 110 fans out to a bank of comparators that compare the input intermediate page address against various intermediate page addresses that have been configured in the re-mapper 110 as a result of the processes discussed previously with respect to FIG. 2. For ease of illustration, only two banks of comparators, labeled 402 and 404 are shown, but in practice there will be considerably more.

Register files 406 and 408, which may physically be part of a single register file, store the mappings. For example, the register file 406 stores an intermediate page address and the physical page address to which it is mapped, and this mapping is associated with the comparator 402. If the comparator 402 indicates a match of the input intermediate page address with the intermediate page address stored in the register file 406, then the comparator 402 provides a signal to the select logic 410 indicating a match. The select logic 410 provides an output signal indicative of this match to the select port 412 of the multiplexer 414. The multiplexer 414 then provides as output the physical page address stored in the register file 406 associated with the comparator 402 for which there is a match. If none of the comparator banks provide a match, then the multiplexer 414 simply propagates as output the input intermediate page address. No arithmetic or shift functions are employed in the particular embodiment of FIG. 4.

Figure 5:
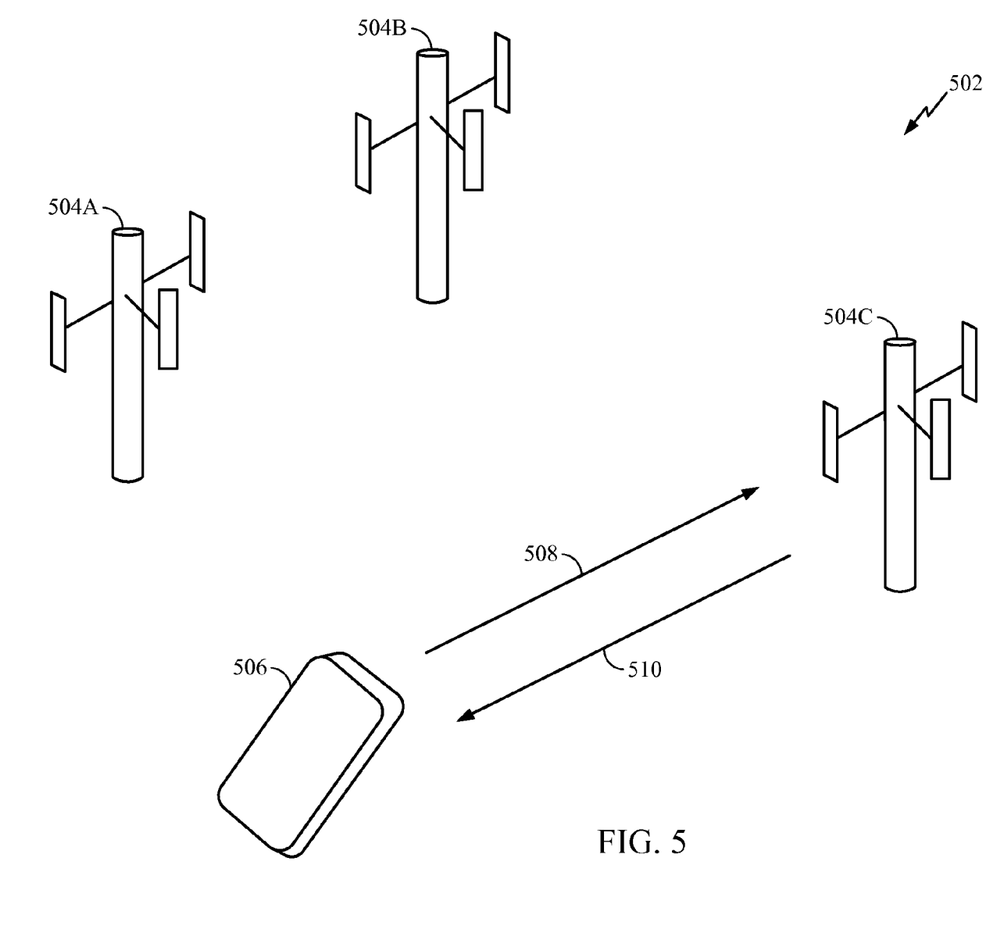
FIG. 5 illustrates a wireless communication system in which embodiments may find application

FIG. 5 illustrates a wireless communication system in which embodiments may find application. FIG. 5 illustrates a wireless communication network 502 comprising base stations 504A, 504B, and 504C. FIG. 5 shows a communication device, labeled 506, which may be a mobile communication device such as a cellular phone (e.g., smartphone), a tablet, or some other kind of communication device suitable for a cellular phone network, such as a computer or computer system. The communication device 506 need not be mobile. In the particular example of FIG. 5, the communication device 506 is located within the cell associated with the base station 504C. Arrows 508 and 510 pictorially represent the uplink channel and the downlink channel, respectively, by which the communication device 506 communicates with the base station 504C.

Embodiments may be used in data processing systems associated with the communication device 506, or with the base station 504C, or both, for example. FIG. 5 illustrates only one application among many in which the embodiments described herein may be employed.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for non-volatile ram error re-mapping. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method comprising:
   detecting an error in a memory cell of a non-volatile memory when a processor performs a read operation to read an old page in the non-volatile memory, the old page having an old page address and including the memory cell;
   storing in an error status table in the non-volatile memory an error status entry having a memory location of the memory cell and an accumulated number of detected errors for the memory cell; and
   directing memory operations to the non-volatile memory referencing the old page address to a new page address in the non-volatile memory when the accumulated number of detected errors for the memory cell exceeds a predetermined threshold.

2. The method of claim 1, directing the memory operations comprising:
   configuring a re-mapper in the non-volatile memory to direct to the new page address memory operations referencing the old page address.

3. The method of claim 2, further comprising:
   correcting the old page to provide a corrected page; and
   performing a memory write operation to write the corrected page to the non-volatile memory, the memory write operation referencing the old page address.

4. The method of claim 2, further comprising:
   storing in a page map table in the non-volatile memory a mapping indicating the old page address and the new page address.

5. The method of claim 4, further comprising:
   performing a boot-up by the processor; and
   configuring by the processor the re-mapper based on the stored page map table during the boot-up.

6. The method of claim 1, further comprising:
   storing in a page map table in the non-volatile memory a mapping indicating the old page address and the new page address.

7. A non-transitory, computer readable storage medium having instructions stored therein, the instructions when executed by at least one processor cause a system to perform a method comprising:
   storing in a non-volatile memory a page map table, the page map table having a set of page map entries, each page map entry having a first field and a second field; and
   configuring a re-mapper in the non-volatile memory based on the page map table, the re-mapper to direct memory operations referencing a page address matching the first field in a page map entry in the page map table to a page address matching the second field in the page map entry.

8. The non-transitory, computer readable storage medium of claim 7, storing in the non-volatile memory further comprising:
   detecting an error in a memory cell in the non-volatile memory based upon a read operation performed on an old page in the non-volatile memory, the page having an old page address and including the memory cell; and
   storing a new page map entry in the page map table, the first field of the new page map entry having a value matching the old page address and the second field of the new page map entry having a value matching a new page address.

9. The non-transitory, computer readable storage medium of claim 8, the method further comprising:
   storing in the non-volatile memory an error status table having a set of error status entries, each error status entry in the error status table having a first field indicating a memory cell location and a second field indicating accumulated number of detected errors associated with the memory cell location.

10. The non-transitory, computer readable storage medium of claim 9, wherein storing the new page map entry in the page map table is performed when the second field of an error status entry in the error status table has a value exceeding a predetermined threshold and the first field of the error status entry in the error status table indicates a memory location for the memory cell.

11. The non-transitory, computer readable storage medium of claim 10, the method further comprising:
   performing a store operation of a corrected version of the old page, the store operation referencing the old page address.

12. An apparatus comprising:
   a memory comprising
      a non-volatile (NV) cell array;
      an error correcting code (ECC) circuit coupled to the NV cell array; and
      a re-mapper to map page addresses; and a processor coupled to the memory, the processor being so that in response to the ECC circuit detecting an error in a memory cell in an old page of the NV cell array when the processor performs a read operation for the old page, the processor stores in an error status table in the NV cell array an error status entry having a memory location of the memory cell and an accumulated number of detected errors for the memory cell, wherein the old page has an old page address and the processor configures the re-mapper to direct memory operations to the NV cell array referencing the old page address to a new page address in the NV cell array when the accumulated number of detected errors for the memory cell exceeds a predetermined threshold.

13. The apparatus of claim 12,
the ECC circuit to correct the old page to provide a corrected page; and
the processor to perform a memory write operation to write the corrected page to the NV cell array, the memory write operation referencing the old page address.

14. The apparatus of claim 13, the processor to store in a page map table in the NV cell array a mapping indicating the old page address and the new page address.

15. The apparatus of claim 14, the memory further comprising:
a sequencer to configure during a power-on the re-mapper based on the stored page map table, the re-mapper being configured to direct memory operations referencing the old page address to the new page address.

16. The apparatus of claim 12, the processor to store in a page map table in the NV cell array a mapping indicating the old page address and the new page address.

17. The apparatus of claim 12, wherein the memory and the processor are in a device selected from the group consisting of a cellular phone, a computer, and a base station.

18. An apparatus comprising:
a processor;
a means for error detection, the means for error detection to detect an error in a memory cell of a non-volatile memory when the processor performs a read operation to read an old page in the non-volatile memory, the old page having an old page address and including the memory cell;
a means for storing, the means for storing to store in an error status table in the non-volatile memory an error status entry having a memory location of the memory cell and an accumulated number of detected errors for the memory cell; and
a means for re-mapping, the means for re-mapping to direct memory operations to the non-volatile memory referencing the old page address to a new page address in the non-volatile memory when the accumulated number of detected errors for the memory cell exceeds a predetermined threshold.

19. The apparatus of claim 18, wherein the processor configures the means for re-mapping to direct to the new page address memory operations referencing the old page address.

20. The apparatus of claim 19,
the means for error detection to correct the old page to provide a corrected page; and
the processor to perform a memory write operation to write the corrected page to the non-volatile memory, the memory write operation referencing the old page address.

* * * * *